(12) United States Patent
Eames

(10) Patent No.: US 8,701,381 B2
(45) Date of Patent: Apr. 22, 2014

(54) REMOTE SHAFT DRIVEN OPEN ROTOR PROPULSION SYSTEM WITH ELECTRICAL POWER GENERATION

(75) Inventor: David John Howard Eames, Indianapolis, IN (US)

(73) Assignee: Rolls-Royce Corporation, Indianapolis (IN)

( * ) Notice: Subject to any disclaimer, the term of this patent is extended or adjusted under 35 U.S.C. 154(b) by 626 days.

(21) Appl. No.: 12/954,161

(22) Filed: Nov. 24, 2010

(65) Prior Publication Data

US 2012/0128487 A1    May 24, 2012

(51) Int. Cl.
*F02C 1/06* (2006.01)
*F02C 3/10* (2006.01)
*F02C 6/00* (2006.01)
*F02G 1/00* (2006.01)
*F02G 3/00* (2006.01)

(52) U.S. Cl.
USPC ........................................ 60/39.163

(58) Field of Classification Search
USPC ......... 60/39.163, 226.1; 244/58, 53 R, 17.25; 416/31, 43
See application file for complete search history.

(56) References Cited

U.S. PATENT DOCUMENTS

| | | | |
|---|---|---|---|
| 2,605,849 A * | 8/1952 | Bordelon | 416/43 |
| 2,732,019 A * | 1/1956 | Stebbins | 416/43 |
| 3,161,237 A * | 12/1964 | Szydlowski | 416/1 |
| 4,222,235 A * | 9/1980 | Adamson et al. | 60/226.1 |
| 4,242,864 A * | 1/1981 | Cornett et al. | 60/226.1 |
| 4,258,545 A * | 3/1981 | Slater | 60/226.1 |
| 4,688,995 A | 8/1987 | Wright et al. | |
| 4,728,261 A | 3/1988 | Wright et al. | |
| 4,734,007 A | 3/1988 | Perry | |
| 4,738,589 A | 4/1988 | Wright | |

(Continued)

FOREIGN PATENT DOCUMENTS

GB    2423509    8/2006

OTHER PUBLICATIONS

UKIPO Search Report, GB 1120303.1, Rolls-Royce Corporation, Mar. 8, 2012.

*Primary Examiner* — Phutthiwat Wongwian
*Assistant Examiner* — William Breazeal
(74) *Attorney, Agent, or Firm* — Krieg DeVault LLP

(57) ABSTRACT

A system for aircraft propulsion is disclosed herein. The system includes a power plant. The system also includes an open rotor module operable to rotate. The open rotor module has a plurality of variable-pitch blades. The system also includes a first linkage extending between the power plant and the open rotor module. The first linkage is operable to transmit rotational power to the open rotor module for rotating the plurality of variable-pitch blades. The system also includes an actuator operable to change a pitch of the plurality of variable-pitch blades. The system also includes a generator operable to generate electric power. The system also includes a second linkage extending between the power plant and the generator. The second linkage is operable to transmit rotational power to the generator. The generator is operable to convert the rotational power to electrical power. The system also includes a controller operably coupled to the actuator to vary a pitch of the plurality of variable-pitch blades. The controller is also operably coupled to the power plant to adjust a power output. The controller is also operably coupled to the generator to determine demand on the generator. The controller is also operable to vary the pitch of the plurality of variable-pitch blades based at least in part on the demand on the generator.

20 Claims, 4 Drawing Sheets

(56) References Cited

U.S. PATENT DOCUMENTS

| | | |
|---|---|---|
| 4,810,164 A | 3/1989 | Wright |
| 4,968,217 A | 11/1990 | Newton |
| 4,998,995 A | 3/1991 | Blythe |
| 5,090,869 A | 2/1992 | Wright |
| 5,364,231 A * | 11/1994 | Eick et al. ............ 416/157 R |
| 6,343,768 B1 * | 2/2002 | Muldoon .................. 244/7 R |
| 6,748,744 B2 * | 6/2004 | Peplow et al. ............. 60/773 |
| 7,107,756 B2 * | 9/2006 | Rolt ........................... 60/224 |
| 7,406,370 B2 * | 7/2008 | Kojori et al. ................ 701/22 |
| 7,584,923 B2 | 9/2009 | Burrage |
| 8,240,124 B2 * | 8/2012 | Colotte et al. ............. 60/204 |
| 8,322,647 B2 * | 12/2012 | Amraly et al. ............ 244/12.4 |
| 2006/0174629 A1 * | 8/2006 | Michalko .................... 60/774 |
| 2008/0253881 A1 * | 10/2008 | Richards .................... 415/145 |
| 2009/0139202 A1 | 6/2009 | Agrawal et al. |
| 2009/0289456 A1 | 11/2009 | McLoughlin et al. |
| 2009/0289516 A1 | 11/2009 | Hopewell et al. |
| 2010/0047068 A1 | 2/2010 | Parry et al. |
| 2010/0124500 A1 | 5/2010 | Lebrun |
| 2010/0133832 A1 | 6/2010 | Butt |
| 2010/0155526 A1 | 6/2010 | Negulescu |
| 2010/0186418 A1 | 7/2010 | Beutin et al. |
| 2010/0206982 A1 * | 8/2010 | Moore et al. ................ 244/62 |
| 2010/0251726 A1 * | 10/2010 | Jones et al. ................. 60/773 |
| 2012/0304619 A1 * | 12/2012 | Beachy Head ............. 60/204 |

* cited by examiner

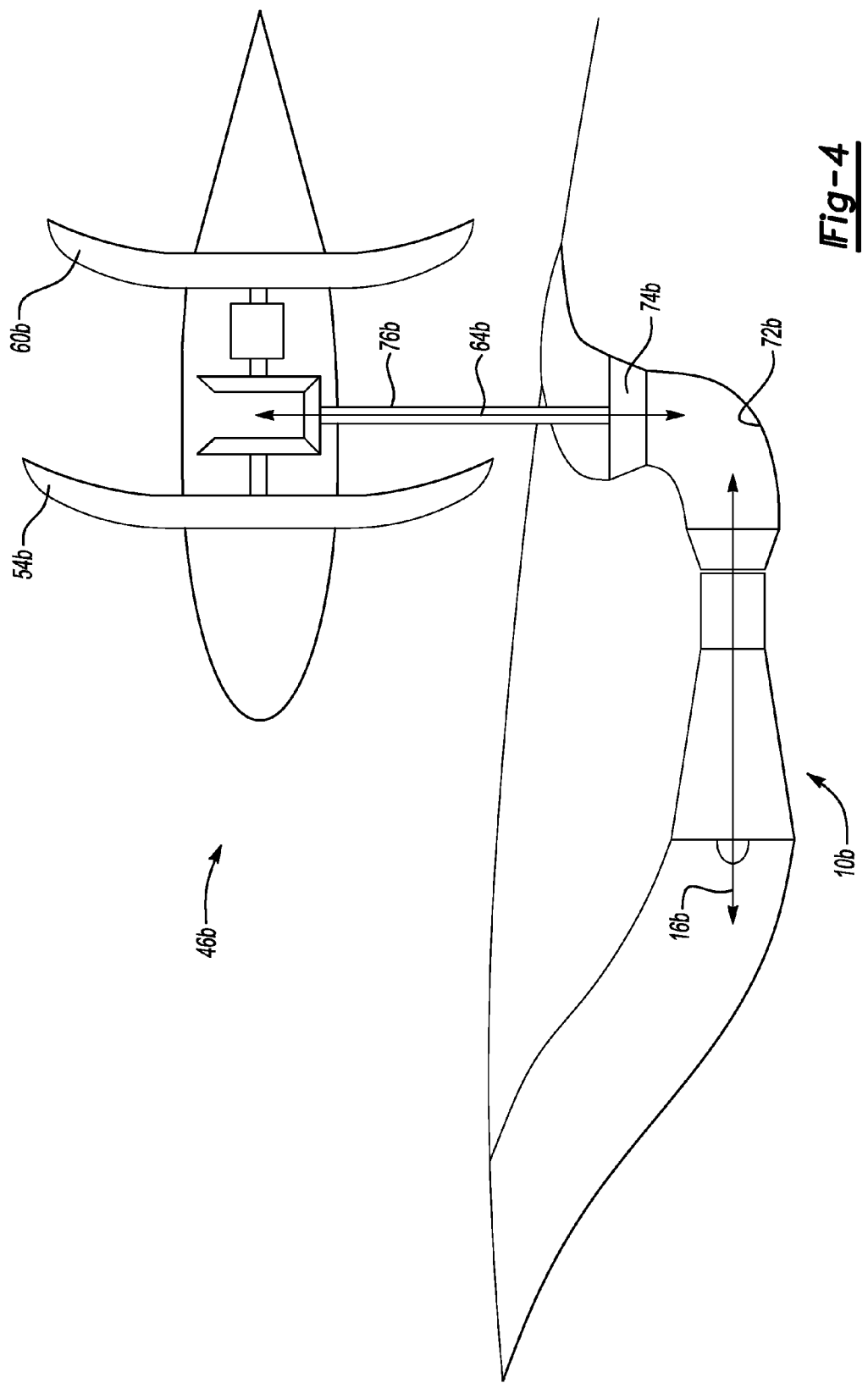

REMOTE SHAFT DRIVEN OPEN ROTOR PROPULSION SYSTEM WITH ELECTRICAL POWER GENERATION

BACKGROUND OF THE INVENTION

1. Field of the Invention

The invention relates to a system for generating propulsion for an aircraft.

2. Description of Related Prior Art

U.S. Pub. No. 2010/0206982 discloses a COUNTER ROTATING FAN DESIGN AND VARIABLE BLADE ROW SPACING OPTIMIZATION FOR LOW ENVIRONMENTAL IMPACT. The disclosure alleges that an air vehicle propulsion system incorporates an engine core with a power shaft to drive an outer blade row. The power shaft extends through and is supported by a counter rotation transmission unit which drives an inner blade row in counter rotational motion to the outer blade row. The counter rotation transmission unit exchanges power from the engine core with the shaft. An actuator engages the shaft for translation from a first retracted position to a second extended position.

SUMMARY OF THE INVENTION

In summary, the invention is a system for aircraft propulsion. The system includes a power plant. The system also includes an open rotor module operable to rotate. The open rotor module has a plurality of variable-pitch blades. The system also includes a first linkage extending between the power plant and the open rotor module. The first linkage is operable to transmit rotational power to the open rotor module for rotating the plurality of variable-pitch blades. The system also includes an actuator operable to change a pitch of the plurality of variable-pitch blades. The system also includes a generator operable to generate electric power. The system also includes a second linkage extending between the power plant and the generator. The second linkage is operable to transmit rotational power to the generator. The generator is operable to convert the rotational power to electrical power. The system also includes a controller operably coupled to the actuator to vary a pitch of the plurality of variable-pitch blades. The controller is also operably coupled to the power plant to adjust a power output. The controller is also operably coupled to the generator to determine demand on the generator. The controller is also operable to vary the pitch of the plurality of variable-pitch blades based at least in part on the demand on the generator.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is a schematic view of a third exemplary embodiment of the invention.

DETAILED DESCRIPTION OF EXEMPLARY EMBODIMENTS

Figure 1:
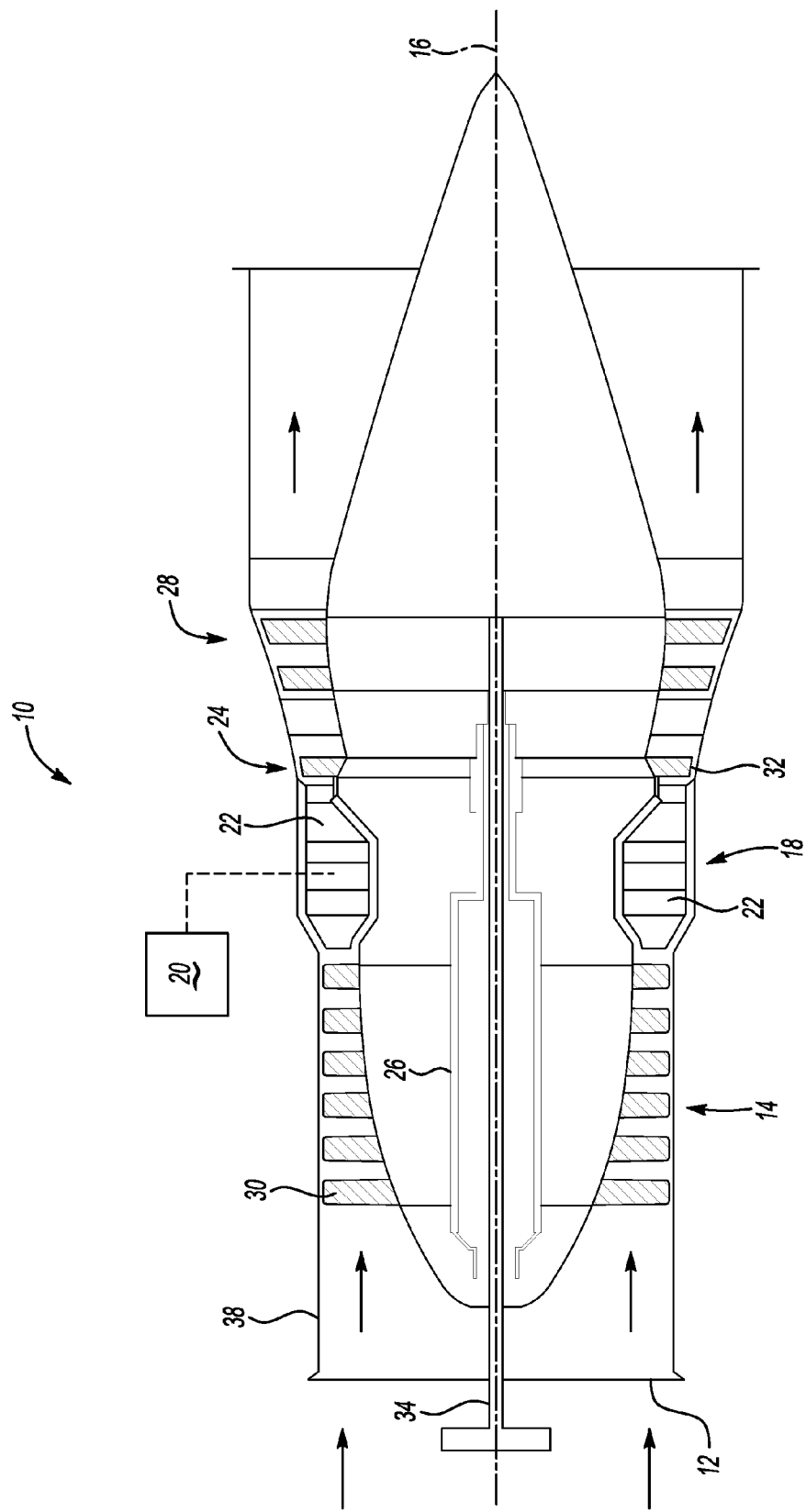
FIG. 1 is a schematic view of a turbine engine which can be incorporated with an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The exemplary embodiment described below provides a system for aircraft propulsion and the rapid generation of high levels of electrical power and simultaneously provides flexibility in component placement and the aircraft packaging. In embodiments of the invention, the control over blade pitch is coordinated with electrical power demands. A power plant such as a turbine engine can supply rotational power to an electrical power source, such as a generator. The power plant can also supply rotational power to a thrust generator such as a rotor having a plurality of rotatable blades. The power plant could also (or alternatively) provide thrust from a propelling exhaust nozzle. When the generator experiences relatively large and sudden demands for power, the pitch of the rotor blades can be flattened so that more power from the power plant can be consumed by the generator. This would allow the power plant to operate at a near constant speed and enhance efficiency. In another aspect of the exemplary embodiment, the central axes of the rotor and the turbine are spaced from one another, allowing greater mounting flexibility of the rotor, the turbine and the generator. The enhanced flexibility could also allow the entire propulsion and power module center of gravity to be adjusted, thus helping aircraft packaging.

A power source or power plant for embodiments of the invention can be an electric motor, a gas turbine or a positive displacement internal combustion engine. FIG. 1 schematically shows a turbine engine 10 that can be incorporated in various embodiments of the invention. The various unnumbered arrows represent the flow of fluid through the turbine engine 10.

The exemplary turbine engine 10 can include an inlet 12 to receive fluid such as air. The turbine engine 10 can include a fan to direct fluid into the inlet 12 in alternative embodiments of the invention. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in a combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24.

In FIG. 1, a single shaft 26 is shown disposed for rotation about the centerline axis 16 of the turbine engine 10. Alternative embodiments of the invention can include any number of shafts. For example, two concentric shafts can be journaled together for relative rotation. The shaft 26 can be a low pressure shaft supporting compressor blades 30 of the compressor section 14. Each row of blades 30 along the axis 16 defines a stage of the compressor section 14. The compressor section 14 can define a multi-stage compressor. The invention can be practiced with a compressor having any number of stages. A plurality of stationary vanes can be positioned to direct fluid precisely across the various rows of blades 30. The shaft 26 can also support turbine blades 32 of the turbine section 24.

FIG. 1 also shows a free power turbine 28 positioned aft of the turbine section 24. After passing the turbine section 24, combustion gases pass over the free power turbine 28 and the various forms of energy associated the combustion gases are converted to kinetic energy. FIG. 1 shows a single shaft 34 fixed to the free power turbine 28. The exemplary shaft 34 extends forward and can deliver rotational power to an accessory system. Alternatively, the shaft 34 could extend aft and deliver rotational power to an accessory system.

A casing 38 defines an annular wall and can be positioned to surround at least some of the components of the turbine engine 10. The exemplary casing 38 can encircle the compressor section 14, the combustor section 18, and the turbine sections 24 and 28. In alternative embodiments of the invention, the casing 38 may encircle less than all of the compressor section 14, the combustor section 18, and the turbine sections 24 and 28.

Figure 2:
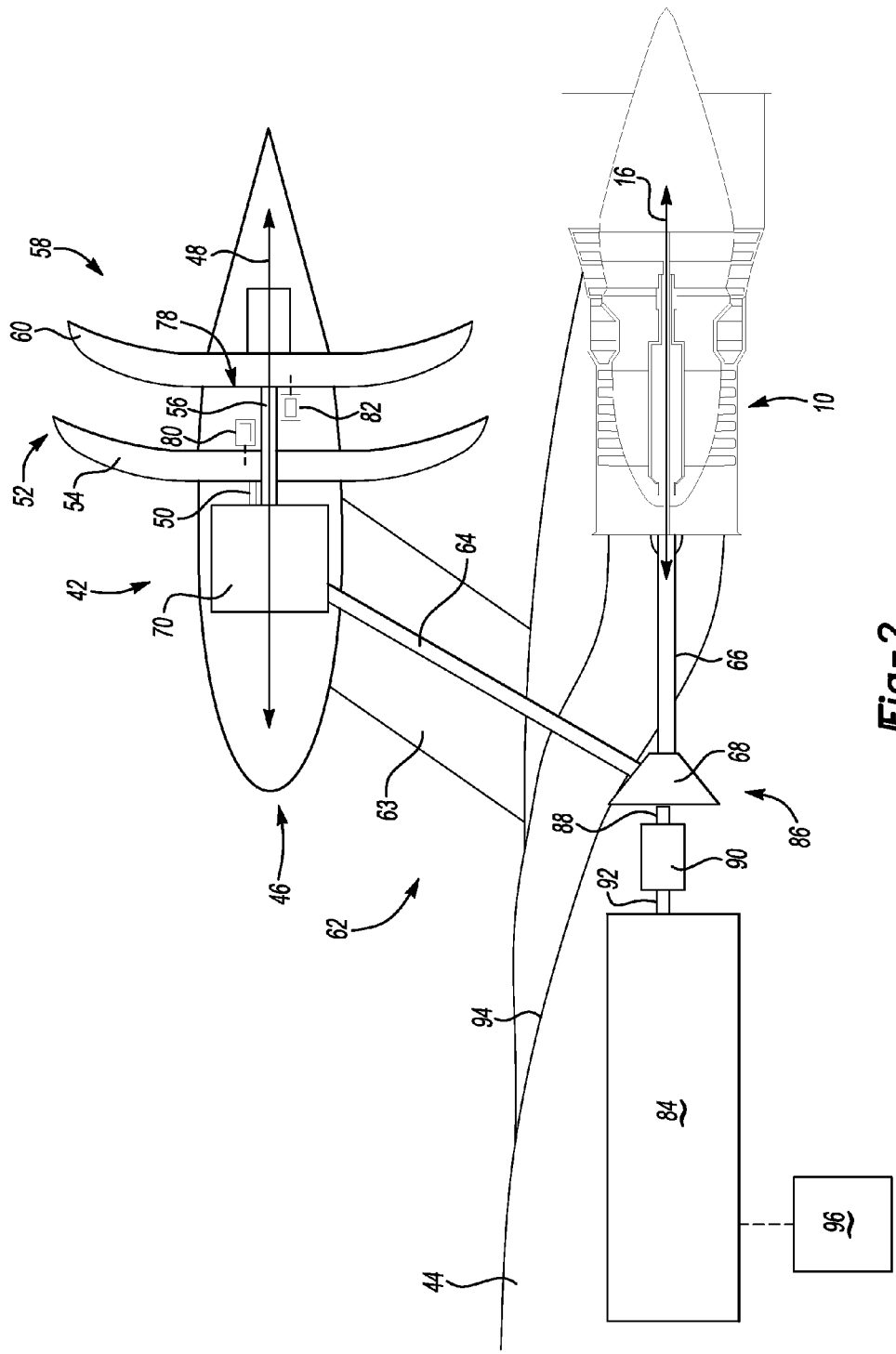
FIG. 2 is a schematic view of a first exemplary embodiment of the invention.

FIG. 2 shows another exemplary embodiment of the invention. The system 42 can generate thrust for an aircraft 44. An arrangement of intake ductwork 94 can allow air to pass to the turbine engine 10. The system 42 also includes an open rotor module 46. In embodiments of the invention, the open rotor module 46 can include one or two open rotors (or propeller assemblies). Also, each open rotor has a plurality of variable-pitch blades. The exemplary open rotor module 46 extends along a longitudinal axis 48 and includes a first shaft 50 and a first open rotor 52 with blades. The first open rotor 52 includes a first row of variable-pitch blades rotatable in a first angular direction, such as blade 54. The exemplary open rotor module 46 also includes a second shaft 56 and a second open rotor 58 with blades. The second open rotor 58 includes a second row of variable-pitch blades rotatable in a first angular direction, such as blade 60. The first and second rows of variable-pitch blades 54, 60 are spaced from one another along the axis 48. The first and second angular directions are opposite to one another such that the first and second rows of blades 54, 60 are counter-rotating. Rotation of the blades generates thrust for the aircraft 44.

The system 42 also includes a first linkage 62 extending between the turbine engine 10 and the open rotor module 46. One portion of the linkage 62, a shaft 64, can extend through a pylon 63. The pylon 63 structurally supports (links) the aircraft fuselage 44 to the open rotor module 46 and provides an aerodynamic fairing for the shaft 64. The first linkage 62 is operable to transmit rotational power to the open rotor module 46 for rotating the plurality of variable-pitch blades 54, 60. In the exemplary embodiment, the turbine engine 10 and the open rotor module 46 are spaced from one another. This feature is viewed as an aspect of the exemplary embodiment of the present invention and also a distinct invention itself. The exemplary first linkage 62 therefore includes the shaft 64 extending transverse (oblique or perpendicular) to the axis 16. The exemplary first linkage 62 also includes a shaft 66 engaged with the turbine engine 10, such as with the free power turbine shaft 34 shown in FIG. 1. The shaft 66 can extend into a gear box 68 that also receives the shaft 64. The shafts 64, 66 can be coupled through appropriate gears housed in the gear box 68.

The shaft 64 engages the open rotor module 46. The engagement can be direct or indirect, such as through a gear box. In the exemplary embodiment, the shaft 64 extends into a gear box 70. The shafts 50, 56 can also extend into the gear box 70. The shafts 50 and 64 can be coupled through appropriate gears housed in the gear box 70. Likewise, the shafts 56 and 64 can be coupled through appropriate gears housed in the gear box 70. The gears in the gear box 70 can be arranged such that the shafts 50 and 56 are counter-rotating relative to one another. Gearboxes 70 and 68 can be connected by shaft 64.

The system 42 also includes an actuator 78 operable to change a pitch of the plurality of variable-pitch blades 54, 60. The actuator 78 is shown schematically in FIG. 2 having components 80 and 82. It is noted that any known arrangement for vary the pitch of a blade can be applied in various embodiments of the invention. The following patents disclose arrangements for varying the pitch of a rotor blade and are hereby incorporated by reference: U.S. Pat. Nos. 4,688,995; 4,728,261; 4,738,589; 4,810,164; 4,968,217; and 5,090,869. It is also noted that other arrangements for varying the pitch of a rotor blade can be applied in various embodiments of the invention.

The system 42 also includes a generator 84 operable to generate electric power. The generator 84 receives rotational power from the turbine engine 10 and converts the rotational power to electrical power. Power can be generated for secondary systems of the aircraft, such as lubrication and hydraulic pumps, avionic sensors and displays, and weapons. The system 42 also includes a second linkage 86 extending between the turbine engine 10 and the generator 84. The second linkage 86 is operable to transmit rotational power to the generator 84. The exemplary second linkage 86 can include a shaft 88 extending from the gear box 68, a clutch 90 engaged with the shaft 88, and a shaft 92 extending from the clutch 90 to the generator 84.

The system 42 also includes a controller 96. In FIG. 2 the controller 96 is shown schematically. The controller 96 is also operably coupled to the generator 84 to determine demand on the generator 84. The controller 96 can detect when the demand for electrical power increases or spikes above a predetermined level. This can occur under a variety of different conditions, including when weapons that require the sudden use of electrical power are activated. The controller 96 is also operably coupled to the actuator 78 to vary a pitch of the plurality of variable-pitch blades 54, 60. It is noted that a dash line between the controller 96 and the components 80 and/or 82 is not shown in order to maintain clarity in the drawings; however, such a dash line can be added to the drawing. The controller 96 is also operable to vary the pitch of the plurality of variable-pitch blades 54, 60 based at least in part on the demand on the generator 84. For example, the controller 96 can control the actuator 78 to flatten a pitch of the plurality of variable-pitch blades 54, 60 when the generator 84 experiences a spike in demanded power. By flattening the pitch of blades 54, 60, the power drawn from the turbine engine 10 by the open rotor module 46 decreases and allows for an increase in the power for the generator 84.

The controller 96 is also operably coupled to the turbine engine 10 to adjust a power output. It is noted that a dash line between the controller 96 and the turbine engine 10 is not shown in order to maintain clarity in the drawings; however, such a dash line can be added to the drawing. The controller 96 can maintain a speed of the turbine engine (and thus the open rotor module 46 as well) as the pitch of blades 54, 60 is flattened. The turbine engine 10 can thus be maintained at a substantially constant operating speed over the time before, during and after the pitch of the blades 54, 60 are varied. With the clutch 90 already engaged, this permits the rapid transfer of power from the open rotor module 46 to the generator 84. Similarly, the controller 96 can control the turbine engine 10 to deliver a substantially constant power output throughout a range of power demands on the generator 84. When more power is required of the generator 84, less power can be delivered to the open rotor module 46 by flattening the pitch of the blades 54, 60. It is noted that the embodiments shown in FIGS. 3 and 4 would also include controllers similar to controller 96.

Figure 3:
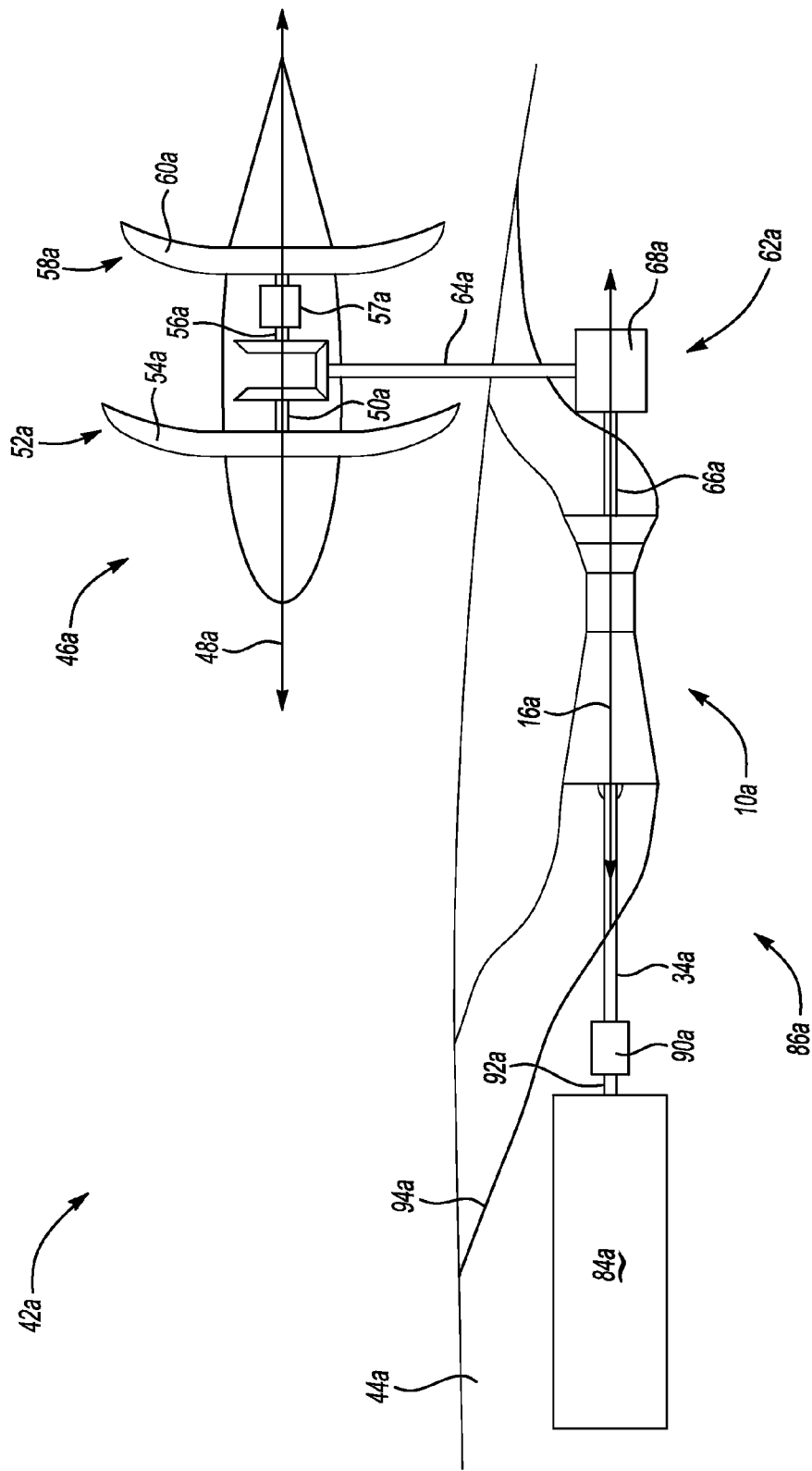
FIG. 3 is a schematic view of a second exemplary embodiment of the invention.

FIG. 3 shows an exemplary embodiment of a remote shaft driven open rotor propulsion system with electrical power generation. A system 42*a* incorporating a turbine engine 10*a* can generate thrust for an aircraft 44*a*. An arrangement of intake ductwork 94*a* can allow air to pass to the turbine engine 10*a*. The system 42*a* also includes an open rotor module 46*a*. In embodiments of the invention, the open rotor module 46*a* can include one or two open rotors (or propeller assemblies). Also, each open rotor has a plurality of variable-pitch blades. The exemplary open rotor module 46*a* a first open rotor 52*a* with blades. The first open rotor 52*a* includes a first row of variable-pitch blades rotatable in a first angular direction, such as blade 54*a*. The exemplary open rotor module 46*a* also includes a second open rotor 58*a* with blades. The second open rotor 58*a* includes a second row of variable-pitch blades rotatable in a second angular direction, such as blade 60*a*. The first and second rows of variable-pitch blades 54*a*, 60*a* are spaced from one another along an axis 48*a*. The first and second angular directions are opposite to one another such that the first and second rows of blades 54*a*, 60*a* are counter-rotating. Rotation of the blades generates thrust for the aircraft 44*a*.

The system 42*a* also includes a first linkage 62*a* extending between the turbine engine 10*a* and the open rotor module 46*a*. The first linkage 62*a* is operable to transmit rotational power to the open rotor module 46*a* for rotating the plurality of variable-pitch blades 54*a*, 60*a*. In the exemplary embodiment, the turbine engine 10*a* and the open rotor module 46*a* are spaced from one another. This feature is viewed as an aspect of the exemplary embodiment of the present invention and also a distinct invention itself. The exemplary first linkage 62*a* therefore includes a shaft 64*a* extending transverse (oblique or perpendicular) to the axis 16*a*.

The exemplary first linkage 62*a* also includes a shaft 66*a* engaged with the turbine engine 10, such as with the free power turbine shaft 34 shown in FIG. 1. The shaft 66*a* can extend into a gear box 68*a* that also receives the shaft 64*a*. The shafts 64*a*, 66*a* can be coupled through appropriate gears housed in the gear box 68*a*. The shaft 64*a* extends between the first and second rows of variable-pitch blades 54*a*, 60*a* along the longitudinal axis 48*a*. The shaft 64*a* links directly with first and second shaft portions 50*a*, 56*a* of the open rotor module 46*a*. The first shaft portion 50*a* can be fixed for rotation with the first row of variable-pitch blades 54*a* and can be spaced from the second portion 56*a* along the axis 48*a*. A clutch 57*a* can optionally be disposed between the shaft portion 56*a* and the open rotor 58*a*. Alternatively, or additionally, a clutch similar to 57*a* could be positioned between shaft 50*a* and rotor 52*a*.

The system 42*a* also includes a generator 84*a* operable to generate electric power. The generator 84*a* receives rotational power from the turbine engine 10*a* and converts the rotational power to electrical power. Power can be generated for secondary systems of the aircraft, such as lubrication and hydraulic pumps, avionic sensors and displays, and weapons. The system 42*a* also includes a second linkage 86*a* extending between the turbine engine 10*a* and the generator 84*a*. The second linkage 86*a* is operable to transmit rotational power to the generator 84*a*. The exemplary second linkage 86*a* can include a shaft 34*a* extending from the turbine engine 10*a*, a clutch 90*a* engaged with the shaft 34*a*, and a shaft 92*a* extending from the clutch 90*a* to the generator 84*a*.

FIG. 4 shows an alternative arrangement in another embodiment of the invention. In FIG. 4, a shaft 64*b* is engaged with an open rotor module 46*b* in a manner similar to the arrangement in FIG. 3. Exhaust ductwork 72*b* extends from a turbine engine 10*b* and communicates combustion gases emanating from the turbine engine 10 to a free power turbine 74*b* centered for rotation on a longitudinal axis 76*b*. The axis 76*b* can be transverse (oblique or perpendicular) to the longitudinal axis 16*b*. The shaft 64*b* is fixed for rotation with the free power turbine 74*b* and directly engages the open rotor module 46*b*. The exhaust ductwork 72*b* can be remote from the plurality of variable-pitch blades 54*b*, 60*b* such that exhaust emanating from the turbine engine 10*b* does not pass over the plurality of variable-pitch blades 54*b*, 60*b*. This eliminates noise compared to arrangements in which exhaust is passed over the blades. Alternatively, the arrangement in FIGS. 2-4 eliminates the significant weight associated with large rotating ducts used when exhaust is passed under the blades. It is noted that a generator could be positioned forward or aft of the turbine engine 10*b*.

Embodiments of the invention can help when considering whether to adopt either a tractor (puller) or pusher open rotor installation on the airframe. Furthermore, embodiments of the invention can offer a third installation option. Both puller and pusher configurations have their own installation issues regarding the local airflow conditions in which they have to operate efficiently and the noise generated by the propulsion system. On some airframe configurations, a puller configuration might be preferred from a community noise standpoint but a pusher configuration might be preferred from an aerodynamic cruise efficiency standpoint. However, pusher configurations have to pass the hot exhaust flow over or under the open rotor blades. This produces noise if passed over the blades or adds significant weight if passed under the blades as this requires large rotating ducts. Embodiments of the invention such as the exemplary embodiment avoid both of these problems, allowing for an optimal open rotor blade row location on the airframe while allowing the gearbox and blades to operate in a cool environment. Additionally, the power plant and (optional) generator can be mounted remotely on the airframe permitting greater flexibility to the aircraft designer. Embodiments of the invention such as the exemplary embodiment also will help reduce development, acquisition and maintenance costs. Any suitable existing or new power plant configuration can be applied in numerous operating environments to provide power to different rotor and aircraft arrangements.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A system for aircraft propulsion comprising:
   a power plant;
   an open rotor module operable to rotate and having a plurality of variable-pitch blades;
   a first linkage extending between said power plant and said open rotor module and operable to transmit rotational power to said open rotor module for rotating said plurality of variable-pitch blades;
   an actuator operable to change a pitch of said plurality of variable-pitch blades;
   a generator operable to generate electric power;
   a second linkage extending between said power plant and said generator and operable to transmit rotational power to said generator, said generator being operable to convert the rotational power to electrical power;
   a programmable controller operably coupled to said actuator to vary a pitch of said plurality of variable-pitch blades, operably coupled to said power plant to adjust a power output of said power plant, and operably coupled to said generator to determine demand on said generator, wherein said controller is operable to vary the pitch of the plurality of variable-pitch blades based at least in part on the demand on said generator.

2. The system of claim 1 wherein said power plant is centered on a first longitudinal axis and said open rotor module rotates about a second longitudinal axis and wherein said first longitudinal axis is spaced from said second longitudinal axis.

3. The system of claim 2 wherein said first longitudinal axis and said second longitudinal axis are parallel to one another.

4. The system of claim 2 wherein:
   said plurality of variable-pitch blades further comprises a first row of variable-pitch blades rotatable in a first angular direction and a second row of variable-pitch blades rotatable in a second angular direction, wherein said first and second rows of variable-pitch blades are spaced from one another along said second longitudinal axis and said first and second angular directions are opposite to one another; and
   said first linkage further comprises a shaft extending one of oblique and perpendicular to said first longitudinal axis, wherein said shaft engages said open rotor module between said first and second rows of variable-pitch blades along said second longitudinal axis.

5. The system of claim 4 wherein said shaft links directly with a first and second portions of said open rotor module, said first portion fixed for rotation with said first row of variable-pitch blades and spaced from said second portion along said second longitudinal axis.

6. The system of claim 2 wherein said first linkage further comprises:
   a free power turbine centered for rotation on a third longitudinal axis that is one of oblique and perpendicular to said first longitudinal axis.

7. The system of claim 6 wherein said first linkage further comprises a shaft extending one of oblique and perpendicular to said first longitudinal axis, wherein said shaft is fixed for rotation with said free power turbine and directly engages said open rotor module.

8. The system of claim 2 further comprising:
   exhaust ductwork extending from said power plant, wherein said exhaust ductwork is remote from said plurality of variable-pitch blades such that exhaust emanating from said power plant does not pass over said plurality of variable-pitch blades.

9. The system of claim 1 wherein said controller is operable to flattening a pitch of said plurality of variable-pitch blades when said generator experiences a spike in demanded power.

10. The system of claim 1 wherein said controller is operable to maintain a speed of the open rotor module as the pitch of said plurality of variable-pitch blades is flattened.

11. The system of claim 1 wherein said controller is operable to control the power plant to deliver a substantially constant power output throughout a range of power demands on said generator.

12. The system of claim 1 wherein said power plant is further defined as a turbine engine.

13. A method of operating an aircraft propulsion system comprising:
   rotating an open rotor module having a plurality of variable-pitch blades with a power plant to generate thrust for an aircraft;
   generating electrical power for the aircraft with a generator receiving rotational power from the power plant;
   determining the electrical power demands placed on the generator; and
   flattening the pitch of the plurality of variable-pitch blades based in response to increasing power demands experienced by said generator.

14. The method of claim 13 wherein said varying step is further defined as:
   flattening the pitch of blades to reduce the power drawn from the power plant by the open rotor module in response to an increase in the power demanded from generator.

15. The method of claim 13 further comprising the step of:
   maintaining an operating speed of the power plant during said varying step as substantially the same as the operating speed immediately prior to said varying step.

16. The method of claim 13 wherein said varying step is further defined as:
   minimizing the power drawn by open rotor module from the power plant while maintaining the speed of the open rotor module.

17. The method of claim 13 further comprising the step of:
   positioning the power plant and the open rotor module parallel to and spaced from one another.

18. A system for aircraft propulsion comprising:
   a turbine engine;
   an open rotor module operable to rotate and having a plurality of variable-pitch blades including first and second rows of counter-rotating variable pitch blades;
   a first linkage extending between said power plant and said open rotor module and operable to transmit rotational power to said open rotor module for rotating said plurality of variable-pitch blades;
   an actuator operable to change a pitch of said plurality of variable-pitch blades;
   a generator operable to generate electric power;
   a second linkage extending between said power plant and said generator and operable to transmit rotational power to said generator, said generator being operable to convert the rotational power to electrical power;
   a controller operably coupled to said actuator to vary a pitch of said plurality of variable-pitch blades, operably coupled to said power plant to adjust a power output, and operably coupled to said generator to determine demand on said generator, wherein said controller is operable to flatten the pitch of the plurality of variable-pitch blades based in response to increasing power demands experienced by said generator.

19. The system of claim 18 wherein said controller is operable to maintain a power output of the turbine engine as the pitch of blade is flattened.

20. The system of claim 18 wherein said turbine engine and said open rotor module extend along respective parallel axes.

* * * * *